United States Patent

Navon

(10) Patent No.: US 6,934,413 B2
(45) Date of Patent: Aug. 23, 2005

(54) SEGMENTATION OF TEXT LINES IN DIGITIZED IMAGES

(75) Inventor: Yaakov Navon, Ein Vered (IL)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 09/887,475

(22) Filed: Jun. 25, 2001

(65) Prior Publication Data

US 2002/0196977 A1 Dec. 26, 2002

(51) Int. Cl.[7] .................................................. G06K 9/34
(52) U.S. Cl. ...................... 382/176; 382/257; 382/281; 382/290; 358/462
(58) Field of Search ................................. 382/101, 102, 382/173–176, 195, 198, 202, 224, 225, 237, 257, 264, 270, 281, 289, 290; 358/462

(56) References Cited

U.S. PATENT DOCUMENTS

| 5,304,787 | A |   | 4/1994  | Wang              |         |
|-----------|---|---|---------|-------------------|---------|
| 5,506,913 | A | * | 4/1996  | Ibison et al.     | 382/132 |
| 5,770,841 | A | * | 6/1998  | Moed et al.       | 235/375 |
| 5,790,403 | A | * | 8/1998  | Nakayama          | 701/28  |
| 5,995,659 | A | * | 11/1999 | Chakraborty et al.| 382/176 |
| 6,064,778 | A | * | 5/2000  | Pasco et al.      | 382/289 |
| 6,195,474 | B1| * | 2/2001  | Snyder et al.     | 382/312 |
| 6,633,409 | B1| * | 10/2003 | Yamazaki          | 358/1.9 |

FOREIGN PATENT DOCUMENTS

| JP | 08272965 A | * | 10/1996 | ............. G06T/7/00 |
| JP | 10224626 A | * | 8/1998  | ............. H04N/1/403 |

OTHER PUBLICATIONS

Wong et al. ("Document Analysis System," IBM J. Research & Development, vol. 26, No. 6, Nov. 1982, pp. 647–656).*
Srihari ("Document Image Understanding," Proc. 1986 ACM Fall Joint Computer Conference, pp. 87–96).*
Messelodi et al., 'Automatic Identification and Skew Estimation of Text Lines in Real Scene Images,' Pattern Recognition 3 (1999), pp. 791–810.*
English translation of JP 08-272965.*
English translation of JP 10-224626.*
Gatos, B, et al., Skew Detection and Text Line Position Determination in Digitized Documents, Pattern Recognition, 1997, 1505–1519, 30(9).
Messelodi, S., et al., Automatic Identification and Skew Estimation of Text Lines in Real Scene Images, Pattern Recognition, 1999, 791–810, 32.

* cited by examiner

*Primary Examiner*—Bhavesh M. Mehta
*Assistant Examiner*—Yubin Hung
(74) *Attorney, Agent, or Firm*—Browdy and Neimark, P.L.L.C.

(57) ABSTRACT

A method for locating symbols arranged in one or more rows in an image includes smearing the image, and fitting line segments through edge points of features in the smeared image. A group is found of the line segments that are in mutual proximity and are mutually substantially parallel. A region of the image that contains the group of the line segments is identified as a possible location of the symbols.

42 Claims, 6 Drawing Sheets

SEGMENTATION OF TEXT LINES IN DIGITIZED IMAGES

FIELD OF THE INVENTION

The present invention relates generally to automated image processing and sorting, and specifically to automatic location of particular items of text on material being sorted.

BACKGROUND OF THE INVENTION

Postal services and package delivery companies typically handle as many as several million parcels each day. Automated parcel sorting and routing facilities are being used increasingly in order to improve the efficiency and accuracy with which this huge volume of parcels is handled.

In order to sort and route the parcels automatically, an image of each parcel is typically captured by a high-resolution imaging system while the parcel travels on a conveyor. An image processor must then rapidly locate and read the destination address on the parcel. This task is complicated by the fact that parcels vary greatly in size and shape, and may be placed on the conveyor for sorting in substantially any orientation. Furthermore, it frequently occurs that address blocks are located close to other text and graphic elements, as well as to tape or other shiny plastic items on the parcel, all of which add substantial "noise" to the address search. These problems are exacerbated by the fact that addresses on parcels typically contain relative few characters arranged in only a few lines, unlike text documents, which generally have redundant data. There is therefore a need for robust, high-speed methods that are capable of finding addresses in a very large, noisy image within the tight time constraints of a large-volume package sorting system.

In an article entitled, "Automatic Identification and Skew Estimation of Text Lines in Real Scene Images," *Pattern Recognition* 32, pp. 791–810 (1999), which is incorporated herein by reference, Messelodi and Modena describe a method for automatically localizing text embedded in complex images. Following preprocessing, various heuristics are employed to characterize text objects which depend on the geometrical and spatial relations among more elementary components. Text line detection is accomplished by recursive nodal expansion of geometrically related components in the image to develop a tree structure.

Another approach to skew detection is disclosed by Gatos et al., in an article entitled, "Skew Detection and Text Line Position Determination in Digitized Documents," *Pattern Recognition* 30, pp. 1505–1519 (1997), which is incorporated herein by reference. This approach attempts to exploit cross correlation between the pixels of vertical lines in a digitized document. A composite correlation matrix is developed for one or more vertical lines, and the skew angle of the document is evaluated from the global maximum of a projection derived from the matrix.

SUMMARY OF THE INVENTION

Preferred embodiments of the present invention provide improved methods and systems for rapidly locating small blocks of text having specified characteristics in a large and/or noisy image. These methods and systems are particularly well suited to finding address information on parcels in high-speed sorting processes.

In preferred embodiments of the present invention, the image to be processed is first binarized, preferably in such a way as to emphasize text (as well as other, similar graphic features). The image is then morphologically smeared. The effect of this smearing is to lengthen the linear runs of black pixels in the image, while reducing the total number of such runs by filling in gaps within the characters. The start and end points of the runs define the edges of the smeared characters. Line segments are fitted to the edges, preferably using Hough transforms, as are known in the art. Clusters of closely-spaced, parallel line segments of appropriate length are identified as possible address regions, wherein the orientation of the line segments gives the skew angle of the text in each region. More detailed processing can then be applied to these regions in order to verify that they do, indeed, contain address information and to read out the information by optical character recognition (OCR).

The techniques of the present invention thus enable rapid, robust scanning of large, noisy images to determine the positions and orientations of text blocks, with substantially no limitation on the range of possible skew angles. Such techniques are particularly useful in high-capacity parcel sorting systems, since they drastically reduce the relative portion of the image that must be subjected to intensive text analysis and ease the task of the OCR engine that reads the address information. The principles of the present invention are also applicable, however, in locating groups of characters and symbols of specified sizes and shapes in images of other types, as well.

There is therefore provided, in accordance with a preferred embodiment of the present invention, a method for locating symbols arranged in one or more rows in an image, the method including:

smearing the image;

fitting line segments through edge points of features in the smeared image;

finding a group of the line segments in mutual proximity that are mutually substantially parallel; and identifying a region of the image that contains the group of the line segments as a possible location of the symbols.

Preferably, the method includes binarizing the image before smearing it, most preferably by applying selective binarization so as to preserve in the binarized image the features of the image that have stroke widths in a predetermined range that is associated with the symbols.

Additionally or alternatively, smearing the image includes applying a morphological expansion operator to the features in the image. Preferably, applying the expansion operator includes expanding the features in a plurality of different directions, and selecting one of the directions so as to minimize a number of runs of consecutive pixels in the smeared image. Most preferably, fitting the line segments through the edge points includes fitting the segments through end points of the runs.

Preferably, fitting the line segments includes applying a Hough transform to the edge points. Additionally or alternatively, fitting the line segments includes determining skew angles of the rows of symbols based on orientations of the line segments. Further additionally or alternatively, finding the group of the line segments includes selecting the line segments for inclusion in the group based on numbers of the edge points that are located on each of the selected line segments.

Further preferably, finding the group of the line segments includes finding end points of the line segments, and selecting the line segments for inclusion in the group whose end points are within a predetermined range of one another.

In a preferred embodiment, identifying the region includes selecting a plurality of regions containing respective groups of the line segments at different skew angles.

There is also provided, in accordance with a preferred embodiment of the present invention, a computer-implemented method for reading characters arranged in one or more rows on an object, including:

capturing an image of the object;

smearing the image;

fitting line segments through edge points of features in the smeared image;

finding a group of the line segments in mutual proximity that are mutually substantially parallel;

identifying a region of the image that contains the group of the line segments as a location of the rows of the characters; and applying optical character recognition to read the characters in the region.

In a preferred embodiment, the object includes a parcel, and the one or more rows of the characters include address information for the parcel. Preferably, sorting the parcel responsive to the address information.

There is additionally provided, in accordance with a preferred embodiment of the present invention, apparatus for locating symbols arranged in one or more rows in an image, including an image processor, which is arranged to smear the image, to fit line segments through edge points of features in the smeared image, to find a group of the line segments in mutual proximity that are mutually substantially parallel, and to identify a region of the image that contains the group of the line segments as a possible location of the symbols.

There is further provided, in accordance with a preferred embodiment of the present invention, apparatus for reading characters arranged in one or more rows on an object, including:

an image capture device, arranged to capture an image of the object; and an image processor, which is arranged to smear the image, to fit line segments through edge points of features in the smeared image, to find a group of the line segments in mutual proximity that are mutually substantially parallel, to identify a region of the image that contains the group of the line segments as a location of the rows of the characters, and to apply optical character recognition to read the characters in the region.

In a preferred embodiment, the object includes a parcel, the one or more rows of the characters include address information for the parcel, and the apparatus includes a sorting device, which is arranged to sort the parcel responsive to the address information.

There is moreover provided, in accordance with a preferred embodiment of the present invention, a computer software product for locating symbols arranged in one or more rows in an image, the product including a computer-readable medium in which program instructions are stored, which instructions, when read by a computer, cause the computer to smear the image, to fit line segments through edge points of features in the smeared image, to find a group of the line segments in mutual proximity that are mutually substantially parallel, and to identify a region of the image that contains the group of the line segments as a possible location of the symbols.

The present invention will be more fully understood from the following detailed description of the preferred embodiments thereof, taken together with the drawings in which:

DETAILED DESCRIPTION OF PREFERRED EMBODIMENTS

Figure 1:
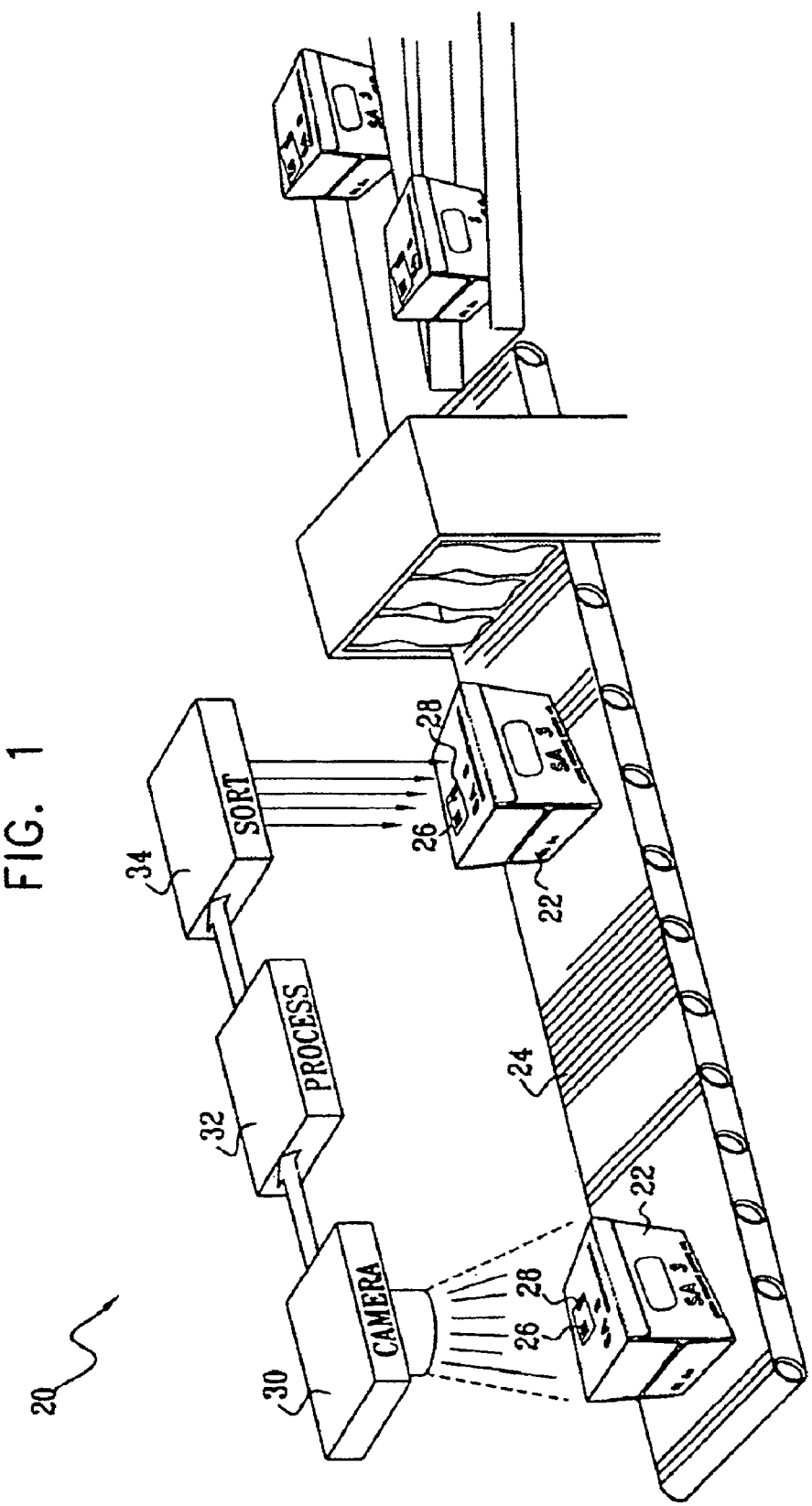
FIG. 1 is a schematic, pictorial illustration of a system for sorting parcels, in accordance with a preferred embodiment of the present invention.

FIG. 1 is a schematic, pictorial illustration of a system 20 for parcel sorting, in accordance with a preferred embodiment of the present invention. A parcel 22 is transported by a conveyor 24. The parcel has a label 26, which typically contains one or more address blocks 28. An image of the parcel, preferably a gray-scale image, is captured by an imaging device 30, preferably a line scan camera operating in a "push-broom" mode. The image captured by the camera is digitized and passed to a processor 32, which applies the methods described hereinbelow to locate address blocks 28 on the parcel. Alternatively, the processor may receive the image from some other source, or it may retrieve the image from a memory (not shown). Typically, after locating the address block, the processor reads the address on label 26 automatically and drives a sorter 34 to route the parcel accordingly.

Processor 32 preferably comprises a general-purpose computer, programmed with appropriate software to carry out the methods of the present invention. This software may be downloaded to the processor in electronic form, over a network, for example, or alternatively, it may be supplied on tangible media, such as CD-ROM, for installation in the processor. Such software may similarly be adapted for use in other image processing applications, and may thus be supplied to and installed on other computers in like manner. Alternatively, the methods described herein may be implemented using dedicated hardware or a programmable digital signal processor, or using a combination of dedicated and/or programmable elements and/or software. The use of processor 32 in the context of parcel sorting system 20 is described here by way of example, and not limitation.

Figure 2:
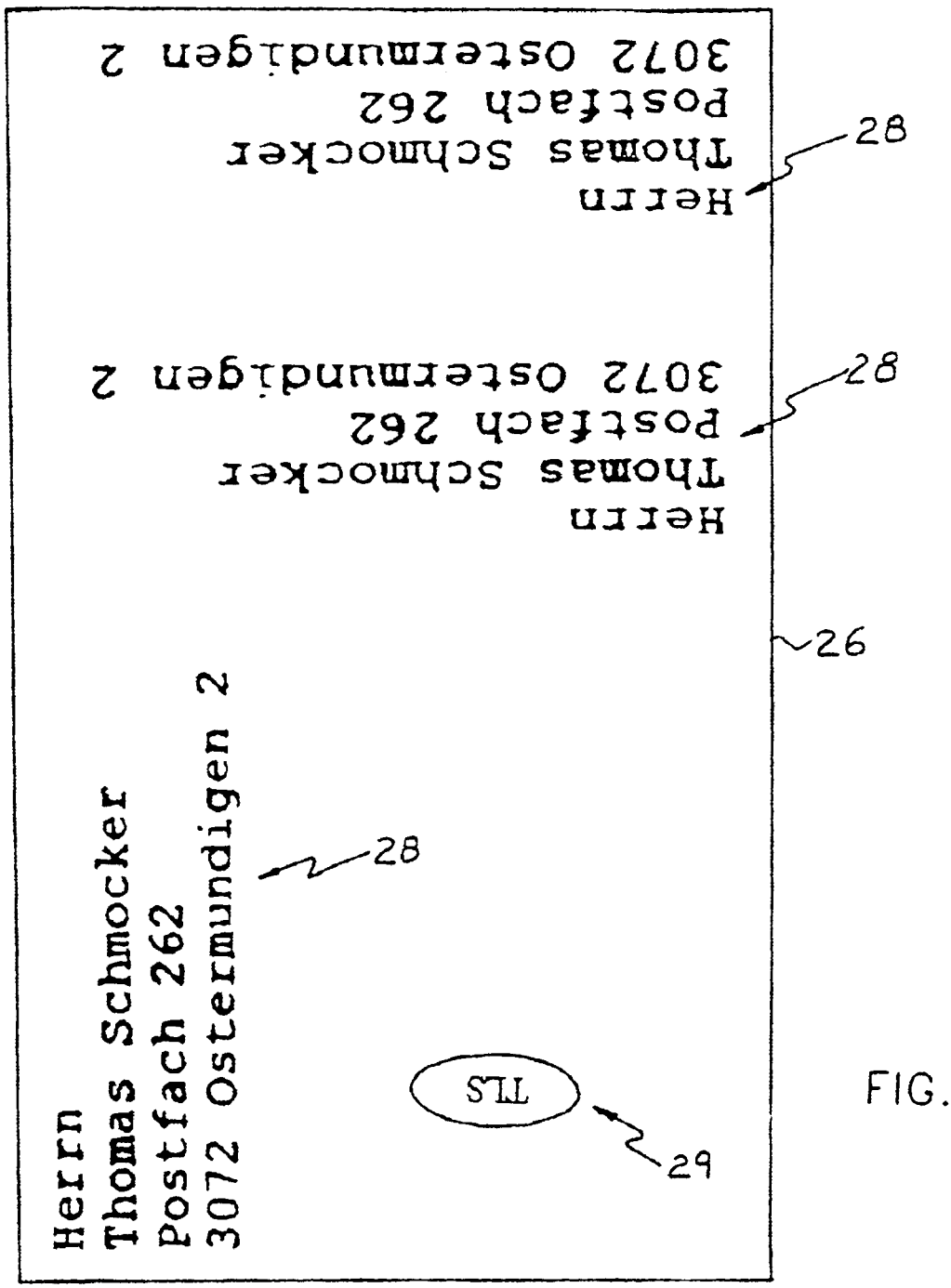
FIG. 2 is a schematic representation of an image captured for processing in the system of FIG. 1.

FIG. 2 is a schematic representation of an image of label 26 captured by imaging device 30 and processed by processor 32, in accordance with a preferred embodiment of the present invention. For the sake of illustration of the method described hereinbelow, label 26 comprises three address blocks 28, as well as one item 29 of spurious textual information.

Figure 3:
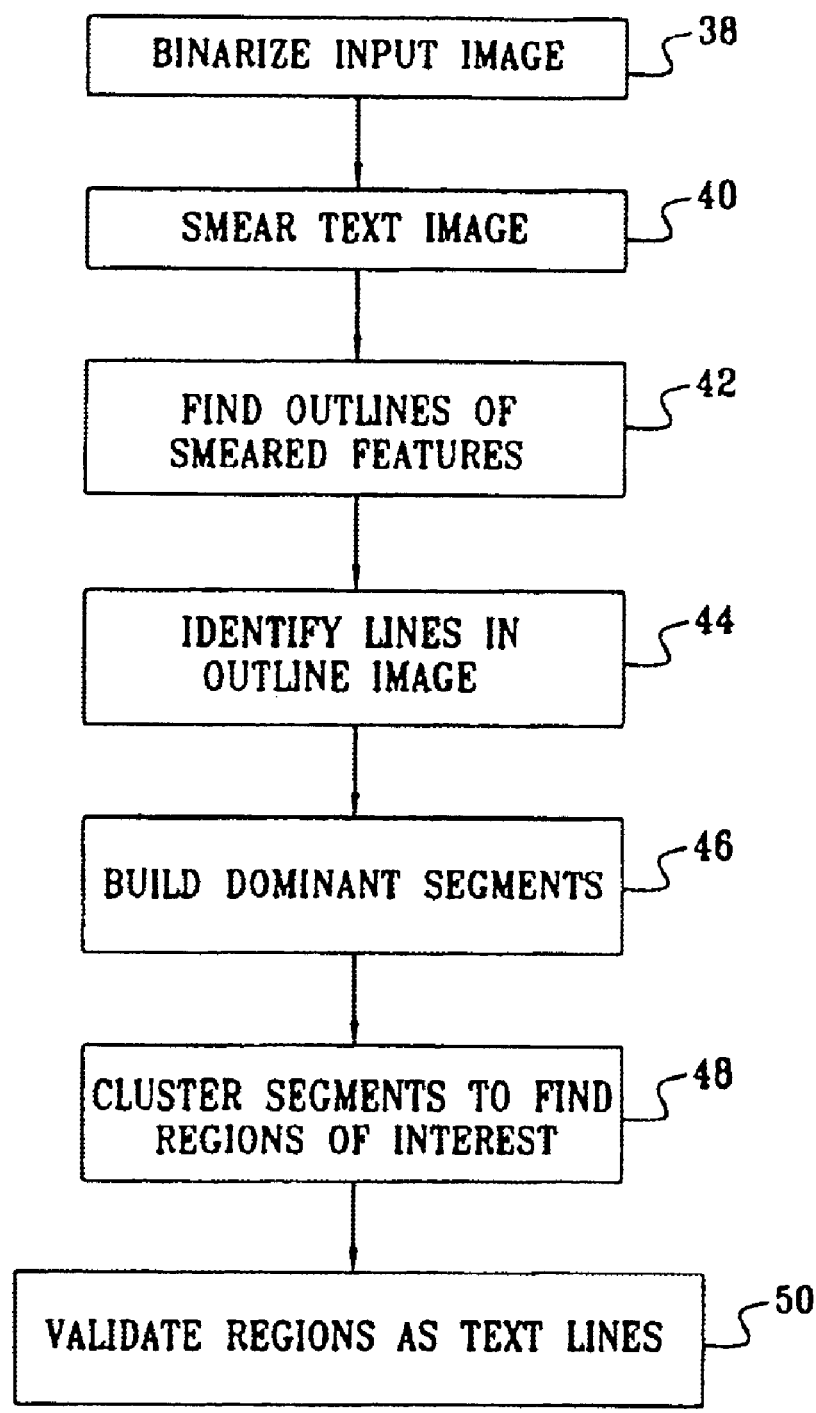
FIG. 3 is a flow chart that schematically illustrates a method for locating an address block in an image, in accordance with a preferred embodiment of the present invention.
Figure 4:
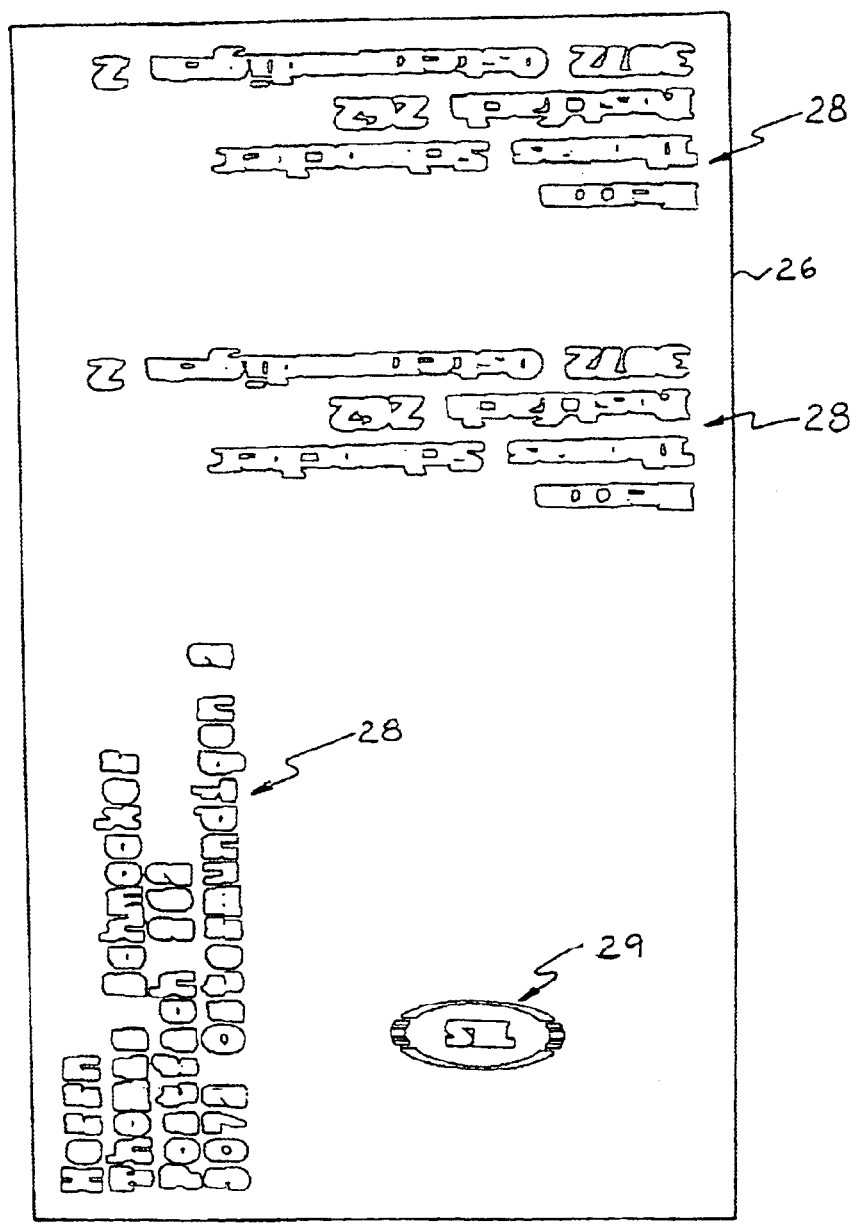
FIGS. 4–6 are schematic representations of the image of FIG. 2, taken at successive processing stages in the method of FIG. 3.
Figure 5:
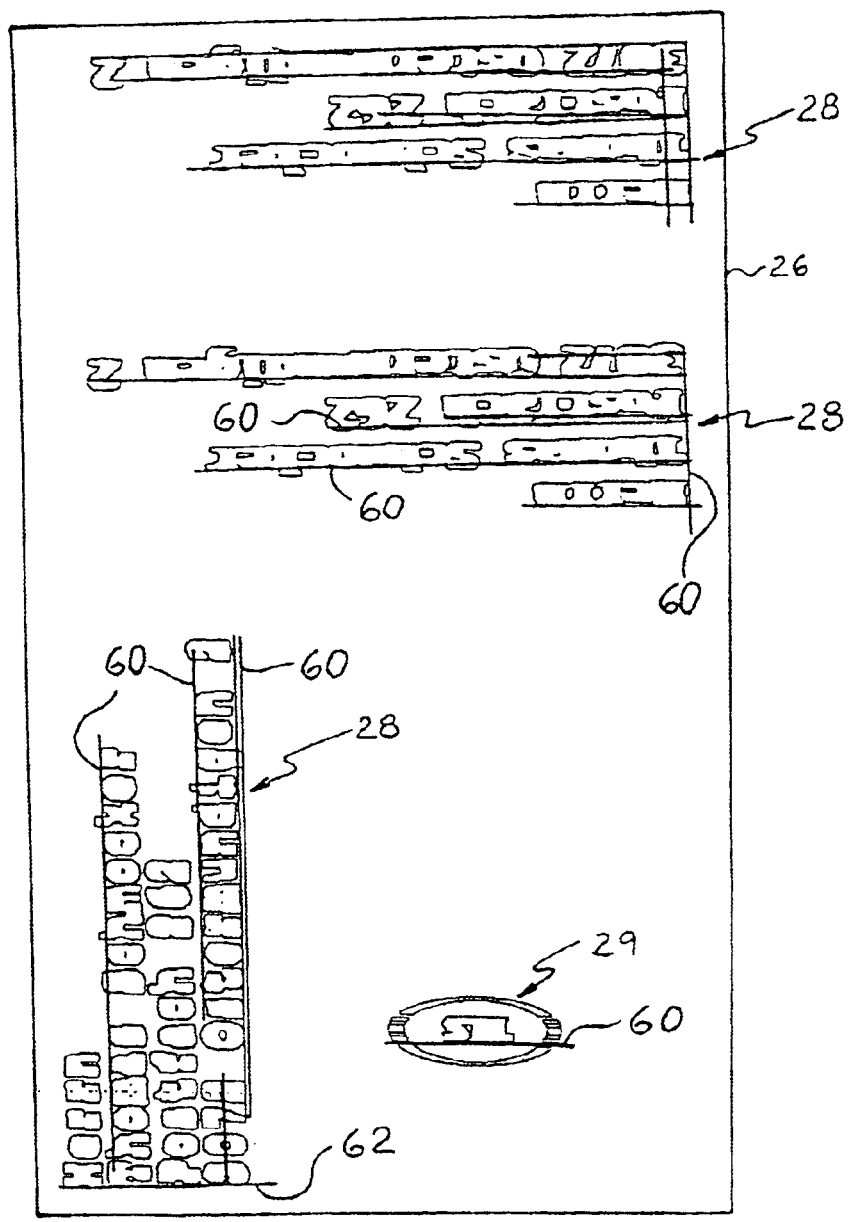
Figure 6:
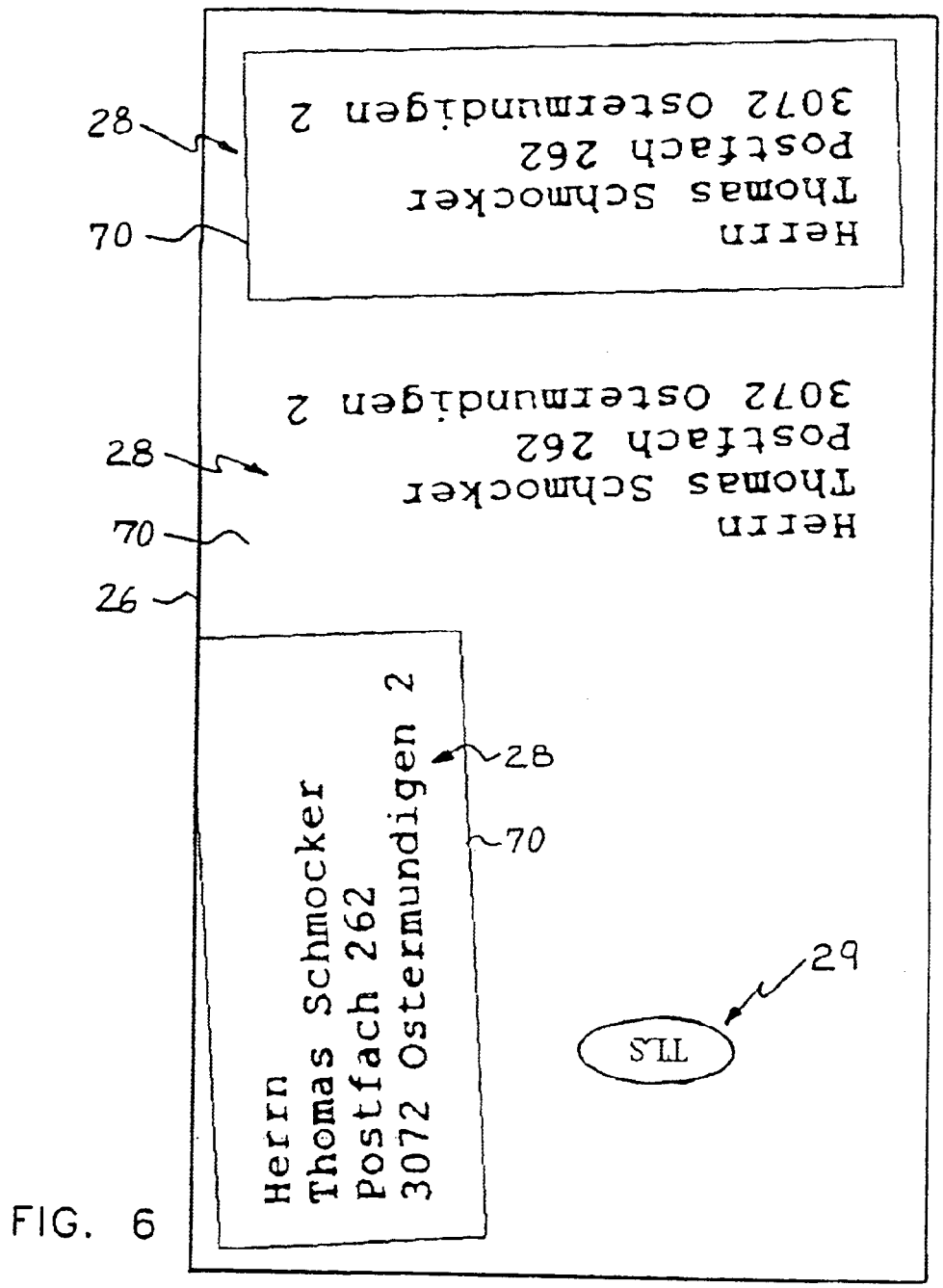

Reference is now made to FIGS. 3–6, which schematically illustrate a method for processing an image of label 26, in accordance with a preferred embodiment of the present invention. FIG. 3 is a flow chart showing the main steps in the method, while FIGS. 4–6 show the results of the processing as applied to the image in FIG. 2, at successive steps in the method.

As noted above, imaging device 30 typically captures gray-scale images. Therefore, as the first stage in processing, the input image is binarized, at a binarization step 38. Binarization is preferably accomplished by the technique disclosed in copending U.S. patent application Ser. No. 09/310,287, of common assignee herewith, whose disclosure is incorporated herein by reference. This technique is based on estimating the range of stroke widths of the textual features in the gray-scale image, and setting local binarization thresholds so as to capture features within this range. The resultant binary image contains only text and graphics whose stroke widths are within this range. This step is useful in eliminating much of the non-textual clutter and noise from the image. FIG. 2 shows the results of such binarization. Alternatively, however, the steps of the method that follow may be applied to an image that was captured in binary form or was binarized by other methods known in the art.

In order to estimate the skew angle of the text in blocks 26, the binary image is smeared, at a smearing step 40. Related methods of skew estimation based on smearing the text image are described in copending U.S. patent application Ser. No. 09/528,483, of common assignee herewith, whose disclosure is incorporated herein by reference. Preferably, step 40 is accomplished by applying a morphological "expand" operator in a number of different directions or patterns, most preferably three patterns: horizontally, vertically, and horizontally and vertically together. Such operators are known in the art. The operator is preferably applied at step 40 in multiple iterations. At each iteration, for every black pixel in the image, if the neighboring pixel(s) in the selected direction(s) is white, it is colored black. As a result of this operation, white gaps inside letters and between letters are filled in with black. The lengths of consecutive runs of black pixels in the image are thus lengthened, while the total number of runs is reduced (since at many locations in the image, multiple short runs are combined into a single long run). Preferably, among the multiple different smeared images generated at step 40 using the different directions or patterns of morphological expansion, the image that gives the smallest total number of runs is chosen for further processing.

Processor 32 next finds the outlines of the smeared letters, at an outlining step 42. The result of this step is shown in FIG. 4. The outlines represent the start and end points of the runs of black pixels in the smeared image, which may be found using image differentiation or substantially any other suitable method known in the art.

The processor fits lines through the outline points, at a line identification step 44. Preferably, the well-known Hough method is used for this purpose. Alternatively, other methods of line fitting known in the art may also be used. The Hough method defines a closed procedure to fit a set of lines to a set of points, wherein the computing time is proportional to the number of points. Preferably, a small set of widely-spaced points is used at step 44 in order to speed up the process. For the line search using the Hough method, the normal representation of a line is used:

$$\rho = x \cos \theta + y \sin \theta$$

Here $\theta$ is the skew angle of the line, and $\rho$ is the normal distance from an origin in the (x,y) plane to the line. A set of points lying on a common line shares the same values of $\rho$ and $\theta$. The Hough plane is a quantized ($\rho[i], \theta[j]$) plane. For each input point (x,y) and each possible $\theta[j]$, $\rho[i]$ is calculated and accumulated in the appropriate (i,j) cell in the Hough plane.

The Hough results are analyzed to find the dominant line segments in the image, at a dominant segment building step 46. The dominant (i,j) cells in the Hough plane, i.e., those with the largest accumulated numbers of counts, correspond to the ($\rho[i], \theta[j]$) parameters of the dominant lines in the image. Dominance is determined, in other words, by the number of (x,y) points which contribute to the given line. Preferably, neighboring cells in the Hough plane are grouped together to determine a single dominant line.

Each dominant line is fragmented into line segments, based on the density of the (x,y) points on the line. Isolated black points are discarded, and only segments that contain a certain minimal density of points over a minimal length are preserved. The minimal density and length limits are preferably determined heuristically, based on the characteristics of system 20. The minimal density is typically proportional to the sampling rate of the image being processed and to the stroke widths of the characters. The minimal length is based on the expected length of the lines in the image, which should be at least several characters long. FIG. 5 shows line segments 60 and 62 that are constructed in this manner.

Line segments 60 are clustered to identify regions of interest (ROIs) in the image, at a clustering step 48. A group of characters in the image can be considered to constitute a possible address block if the characters are arranged in a number of parallel rows of appropriate length, appearing at a reasonable location in the image. In terms of line segments 60 found at step 46, this criterion means that an address block should be characterized by a number of roughly parallel line segments clustered together in a certain region. As seen in FIG. 5, the text in the image, and thus the corresponding line segments, as well, may have different skew angles at different locations. Therefore, step 48 is preferably carried out in three successive stages:

1. Line segments are classified by skew angle ($\theta$).
2. Segments in the same skew angle class are grouped by location ($\rho$), to find parallel segments that are closely spaced. These segments presumably run along the text rows of interest.
3. Segments in the same ($\rho, \theta$) class are classified according to the endpoints of the segments. This classification eliminates sparsely-printed text and groups segments whose endpoints fall within a common range.

In other words, assuming the skew angle for a group of line segments to define an abscissal direction (X-axis) in a local coordinate system, stage 2 groups the segments that are parallel to this axis and whose ordinates are within a given range. Stage 3 then selects the line segments according to the abscissae of their endpoints. Alternatively, the order of the stages may be varied, and other classification schemes may also be used.

Each group of segments identified in step 48 defines a parallelogram (or rectangular) region in the image, which contains the segments in the group. Each such region is then processed further, at a validation step 50, in order to verify that it meets the criteria of an address block. Various criteria may be used for this purpose, including the size of the region, number of line segments and number of points on the line segments. FIG. 6 shows three ROIs 70 that are identified in this manner. Item 29, which contains text but does not meet the criteria of step 50, is eliminated. Processor 32 can now perform further analysis steps on the contents of ROIs 70, such as OCR and text processing, while ignoring the remainder of the image.

Although preferred embodiments are described herein with reference to processing of address blocks 28 on parcels 22, the principles of the present invention are similarly applicable to rapidly finding groups of characters or symbols of other types, meeting predefined criteria, within other sorts of large and noisy images. For example, the methods and systems described hereinabove may be applied, mutatis mutandis, to detection of barcodes in images of parcels and other objects. Further aspects of barcode detection are described in a copending U.S. patent application entitled "Fast Barcode Search," filed May 2, 2001, of common assignee herewith, whose disclosure is incorporated herein by reference.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for locating symbols arranged in a plurality of parallel rows in an image, the method comprising:
   smearing the image;
   fitting line segments through edge points of features in the smeared image;
   finding a group of the line segments in mutual proximity that are mutually substantially parallel, the group comprising at least a predetermined number of the line segments, which run along respective rows among the plurality of the parallel rows of the symbols at different, respective distances from a given origin; and
   identifying a region of the image that contains the group of the line segments as a possible location of the symbols.

2. A method according to claim 1, and comprising binarizing the image before smearing it.

3. A method according to claim 2, wherein binarizing the image comprises applying selective binarization so as to preserve in the binarized image the features of the image that have stroke widths in a predetermined range that is associated with the symbols.

4. A method according to claim 1, wherein smearing the image comprises applying a morphological expansion operator to the features in the image.

5. A method according to claim 4, wherein applying the expansion operator comprises expanding the features in a plurality of different directions, and selecting one of the directions so as to minimize a number of runs of consecutive pixels in the smeared image.

6. A method according to claim 5, wherein fitting the line segments through the edge points comprises fitting the segments through end points of the runs.

7. A method according to claim 1, wherein fitting the line segments comprises applying a Hough transform to the edge points.

8. A method according to claim 1, wherein fitting the line segments comprises determining skew angles of the rows of symbols based on orientations of the line segments.

9. A method according to claim 1, wherein finding the group of the line segments comprises selecting the line segments for inclusion in the group based on numbers of the edge points that are located on each of the selected line segments.

10. A method according to claim 1, wherein finding the group of the line segments comprises finding end points of the line segments, and selecting the line segments for inclusion in the group such that all the end points of all the line segments in the group are within a predetermined range of one another.

11. A method according to claim 1, wherein identifying the region comprises selecting a plurality of regions containing respective groups of the line segments at different skew angles.

12. A computer-implemented method for reading characters arranged in a plurality of parallel rows on an object, comprising:
    capturing an image of the object;
    smearing the image;
    fitting line segments through edge points of features in the smeared image;
    finding a group of the line segments in mutual proximity that are mutually substantially parallel, the group comprising at least a predetermined number of the line segments, which run along respective rows among the plurality of the parallel rows of the symbols at different, respective distances from a given origin;
    identifying a region of the image that contains the group of the line segments as a location of the rows of the characters; and
    applying optical character recognition to read the characters in the region.

13. A method according to claim 12, wherein the object comprises a parcel, and wherein the one or more rows of the characters comprise address information for the parcel.

14. A method according to claim 13, and comprising sorting the parcel responsive to the address information.

15. Apparatus for locating symbols arranged in a plurality of parallel rows in an image, comprising an image processor, which is arranged to smear the image, to fit line segments through edge points of features in the smeared image, to find a group of the line segments in mutual proximity that are mutually substantially parallel, the group comprising at least a predetermined number of the line segments, which run along respective rows among the plurality of the parallel rows of the symbols at different, respective distances from a given origin, and to identify a region of the image that contains the group of the line segments as a possible location of the symbols.

16. Apparatus according to claim 15, wherein the image processor is arranged to binarize the image before smearing it.

17. Apparatus according to claim 16, wherein the processor is arranged to binarize the image by applying selective binarization so as to preserve in the binarized image the features of the image that have stroke widths in a predetermined range that is associated with the symbols.

18. Apparatus according to claim 15, wherein the processor is arranged to smear the image by applying a morphological expansion operator to the features in the image.

19. Apparatus according to claim 18, wherein the processor is arranged to expand the features in a plurality of different directions, and to select one of the directions so as to minimize a number of runs of consecutive pixels in the smeared image.

20. Apparatus according to claim 19, wherein the processor is arranged to fit the line segments through end points of the runs.

21. Apparatus according to claim 15, wherein the processor is arranged to fit the line segments by applying a Hough transform to the edge points.

22. Apparatus according to claim 15, wherein the processor is arranged to determine skew angles of the rows of symbols based on orientations of the line segments.

23. Apparatus according to claim 15, wherein the processor is arranged to select the line segments for inclusion in the group based on numbers of the edge points that are located on each of the selected line segments.

24. Apparatus according to claim 15, wherein the processor is arranged to find end points of the line segments, and to select the line segments for inclusion in the group such that all the end points of all the line segments in the group are within a predetermined range of one another.

25. Apparatus according to claim 15, wherein the processor is arranged to select a plurality of regions containing respective groups of the line segments at different skew angles.

26. Apparatus for reading characters arranged in a plurality of parallel rows on an object, comprising:

an image capture device, arranged to capture an image of the object; and an image processor, which is arranged to smear the image, to fit line segments through edge points of features in the smeared image, to find a group of the line segments in mutual proximity that are mutually substantially parallel, the group comprising at least a predetermined number of the line segments, which run along respective rows among the plurality of the parallel rows of the symbols at different, respective distances from a given origin, to identify a region of the image that contains the group of the line segments as a location of the rows of the characters, and to apply optical character recognition to read the characters in the region.

27. Apparatus according to claim 26, wherein the object comprises a parcel, and wherein the one or more rows of the characters comprise address information for the parcel.

28. Apparatus according to claim 27, and comprising a sorting device, which is arranged to sort the parcel responsive to the address information.

29. A computer software product for locating symbols arranged in a plurality of parallel rows in an image, the product comprising a computer-readable medium in which program instructions are stored, which instructions, when read by a computer, cause the computer to smear the image, to fit line segments through edge points of features in the smeared image, to find a group of the line segments in mutual proximity that are mutually substantially parallel, the group comprising at least a predetermined number of the line segments, which run along respective rows among the plurality of the parallel rows of the symbols at different, respective distances from a given origin, and to identify a region of the image that contains the group of the line segments as a possible location of the symbols.

30. A product according to claim 29, wherein the instructions cause the computer to binarize the image before smearing it.

31. A product according to claim 30, wherein the instructions cause the computer to binarize the image by applying selective binarization so as to preserve in the binarized image the features of the image that have stroke widths in a predetermined range that is associated with the symbols.

32. A product according to claim 29, wherein the instructions cause the computer to smear the image by applying a morphological expansion operator to the features in the image.

33. A product according to claim 32, wherein the instructions cause the computer to expand the features in a plurality of different directions, and to select one of the directions so as to minimize a number of runs of consecutive pixels in the smeared image.

34. A product according to claim 33, wherein the instructions cause the computer to fit the line segments through end points of the runs.

35. A product according to claim 29, wherein the instructions cause the computer to fit the line segments by applying a Hough transform to the edge points.

36. A product according to claim 29, wherein the instructions cause the computer to determine skew angles of the rows of symbols based on orientations of the line segments.

37. A product according to claim 29, wherein the instructions cause the computer to select the line segments for inclusion in the group based on numbers of the edge points that are located on each of the selected line segments.

38. A product according to claim 29, wherein the instructions cause the computer to find end points of the line segments, and to select the line segments for inclusion in the group such that all the end points of all the line segments in the group are within a predetermined range of one another.

39. A product according to claim 29, wherein the instructions cause the computer to select a plurality of regions containing respective groups of the line segments at different skew angles.

40. A product according to claim 29, wherein the symbols comprise characters, and wherein the instructions cause the computer to apply optical character recognition to read the characters in the identified region.

41. A product according to claim 40, wherein the image comprises a parcel, and wherein the one or more rows of the symbols comprise address information for the parcel.

42. A product according to claim 41, wherein the instructions cause the computer to sort the parcel responsive to the address information.

* * * * *